Aug. 22, 1933.   J. T. LOVETT, JR   1,923,677
PLANT PACKAGE AND METHOD OF MAKING AND TRANSPLANTING THE SAME
Filed Nov. 18, 1931
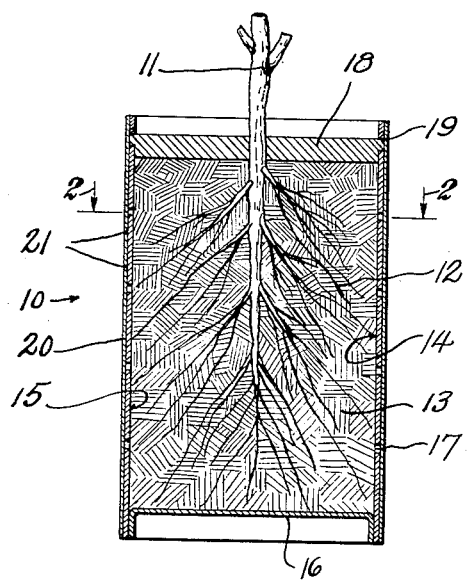
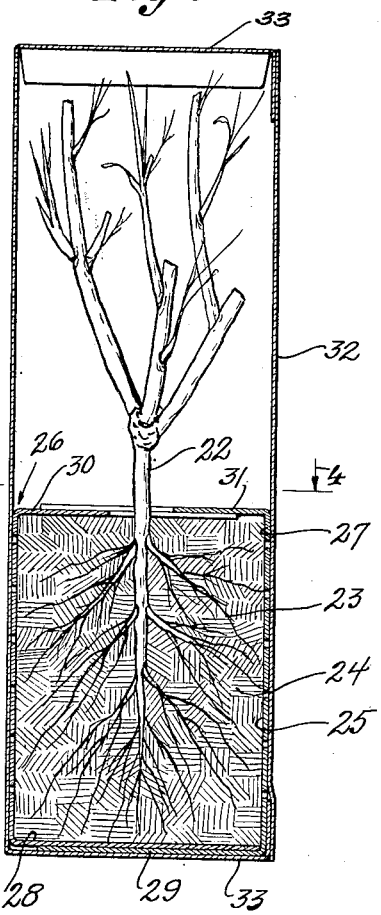
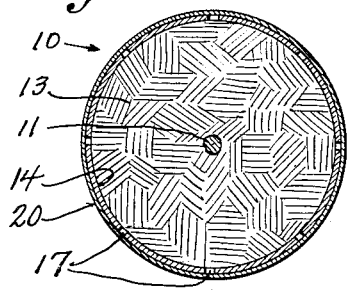
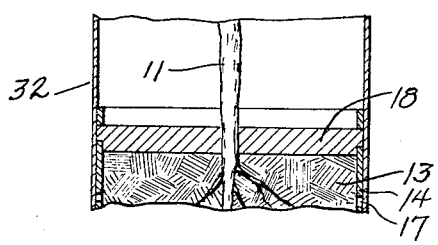
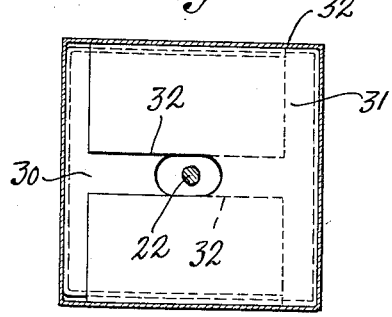

Patented Aug. 22, 1933

1,923,677

UNITED STATES PATENT OFFICE 1,923,677

PLANT PACKAGE AND METHOD OF MAKING AND TRANSPLANTING THE SAME

John Thompson Lovett, Jr., Little Silver, N. J.

Application November 18, 1931
Serial No. 575,718

11 Claims. (Cl. 47—37)

This invention relates to plant balls and methods of making and transplanting the same.

One object of this invention is to provide an improved plant ball having humus and a container therefor in contact with the humus and made of a material that is readily disintegrated by the humus.

Other objects of the invention are to furnish a plant package including an improved circular or fibrous container having a closure consisting of a material that seals in setting; an improved locking connection between the closure and a wall of the package; an improved package, the wall of which is re-enforced by the solid closure.

Another object of this invention is the provision of a plant ball including a material such as humus, and improved container means therefor comprising a weakened or perforated enclosure, and, if desired, an associated imperforate casing element for surrounding the enclosure, and which may preferably be removable, and may be resistive to the humus.

Another object of the invention is to furnish an improved method of making a plant ball such that a uniform homogeneous ball is produced with humus having a requisite moisture content, disposed closely around the roots of the plant, avoiding the formation of voids and assuring against any injury to the plant roots either in course of making the plant ball or in handling or shipping thereof.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

In the drawing:

Figure 1 is a vertical sectional view of a plant package embodying the invention.

Fig. 2 is a horizontal sectional view taken on line 2—2 of Fig. 1.

Fig. 3 is a vertical sectional view showing a modification of the invention.

Fig. 4 is a horizontal sectional view taken on line 4—4 of Fig. 3.

Fig. 5 is a fragmentary sectional view of a modification of the invention.

Generally described, this invention provides a plant ball including a material packed around the roots of a plant, such as a young tree, and which is light in weight, affords ample nutrition for the plant, is free of any acid which might interfere with the growth of the plant, and is well adapted to contain moisture for a long period of time while the plant is being handled, shipped, or maintained in cold storage. While these characteristics are, in general, fundamentally important for an efficient plant ball, my invention contemplates that the material for the plant ball shall in addition have the quality of being destructive to a container therefor; differently stated, there is a co-ordination in the inherent nature of the plant ball material and the container such that the latter is adapted to be acted upon by said material to be disintegrated thereby at ordinary temperatures, say above 50° F., and to be unaffected at temperatures below this limit. I have found that all of the above mentioned conditions are satisfied by utilizing humus in forming the plant ball and making the container of a fibrous vegetable or other material that is disintegrated by the humus. It will be noted that the humus may be used in pure form or mixed with other materials, such as ordinary earth, fertilizer, manure or peat; but all the advantages are best realized by using pure humus. By humus is meant the decayed product of organic or vegetable matter, caused by aerobic bacteria and fungi, which constantly create a continuous supply of available plant food. The container may be made of a sheet material such as paper, occupying little space and being inexpensive to make and convenient to handle. The plant ball may thus be small and have a large quantity of humus through which the roots of the plant may be properly spread. The disintegration of the container may be accelerated by the provision of weakened or less resistive areas therein, for which purpose, score lines, chemical treatment, and the like, may be used, though perforations will be ordinarily sufficient. Therefore, the container may have re-enforcing means, such as a cover, or sleeve, and the same may also act as a closure for the perforations, and may be suitably treated to render it resistive to the action of the humus. It may be desirable to make the cover removable particularly when the plant ball is to be transferred into the ground, so that moisture may be adapted to enter the plant ball through the perforations and the destruction of the container rapidly proceed. However, certain sections of the container may be treated or waxed to decrease the speed of or entirely avoid the disintegration of those sections by the humus and hence to increase the reliability of the container. While the container may be made in different forms, it is preferably round or cylindrical to sustain and properly distribute the stresses therein, without distortion or buckling. To assure adequate retention of the soil or humus a suitable cover may be used, preferably of a material that, in setting, re-enforces and forms a seal with the container wall, which seal naturally conforms to and closely embraces the stem of the plant. This seal may be removed in transplanting, as by cutting the container wall.

It has been known to provide plant balls including peat, for example, in the form of a pot of pressed peat into which earth and a fertilizer or earth alone may be placed. A device of this kind is unsatisfactory for various reasons: The plant package becomes too large or there is too little space for the plant roots, or food for the plant since peat has practically no plant food. Furthermore, peat rapidly absorbs any moisture in the earth of the plant ball, so that the latter has to be watered; but this in turn causes the peat to loosen up so that the pot breaks apart. Then again, peat is oftentimes of an acidy character and hence detrimental to certain kinds of plants, while fertilizer may have a similar quality, and being an artificial chemical product, may also be otherwise injurious to certain plants.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

Referring in detail to the drawing, 10 denotes a plant package embodying the invention. The same may include a plant, such as a small tree 11 having its roots 12 surrounded by a mass of humus 13 disposed in any suitable manner, as by being packed between and around the roots to a sufficient degree so that the roots are in thorough contact with the humus and the latter fully encases and protects the same. The humus which is so used includes a suitable quantity of moisture which may be equal to that generally found in humus, and at any rate the moisture may render the humus very soft and easy to work and mold into any desired form, so as to penetrate thoroughly along the roots, without exerting any stress thereon or injuring the delicate ends of the roots. Hence a suitable quantity of water may be added to the humus which may then be thoroughly mixed to distribute the same, until the humus acquires a proper consistency, just short of wetness.

The mass of humus and roots is contained in any suitable container 14 which may be of various constructions, or shapes, and may be made of any desired material. If it be desired that the plant ball shall be transplanted into the ground without removing the container 14, so as to reduce to a minimum the necessary handling for the device, it may be found desirable to utilize a container which is amenable to such purposes, as by reason of porosity, or destructibility in one manner or another, so that the plant may continue to grow and develop without handicap. Preferably the container 14 is made of a material which is destructible at an accelerated rate by natural influences, for instance, with especial regard to the activity of fungi and bacteria in humus. I have found, therefore, that a material of fibrous or vegetable character which is subject to attack by the fungi and aerobic bacteria, in which humus is rich, is of particular advantage. Among specific materials that can be used may be mentioned paper, coarse burlap treated with starch, and the like; but even certain composition materials such as "Cellophane" have been affected in this manner. It is sufficient, but at the same time an absolute requisite, that the material of which the container is made shall not be disintegrated by humus at comparatively low temperatures, say below 50° F., since the plant package may thus be maintained in cold storage or under similar conditions.

The container 14 may be constructed in various ways, as, for example, of sheet material of the nature above specified, and which lends itself readily to be made up into a box or other form of receptacle, which is light, compact, inexpensive, and affords a maximum space for the reception of the humus and the roots of the plant, with an adequate spread of the roots. A simple form of container may include a side wall 15 and a bottom wall 16 joined in any suitable manner. The container may, moreover, be polygonal, round, irregular, or of any other form, but is preferably circular, and may be cylindrical in shape.

To facilitate disintegration of the container 14 by the humus, the container may have weakened areas, or it may be porous, or perforated as shown at 17. The bottom wall, however, may be imperforate for adequate retention of the humus, and may be secured to the side wall with adhesive or fasteners as may be desired.

To enclose the humus at the top of the package, a suitable cover may be provided, such as a layer 18 of material that is adapted to harden and form a seal. For this purpose, cement, plaster of Paris, asphalt or the like may be used. A seal of this character is adapted to fit closely around the stem of the plant, regardless of the size or shape of the stem or its position in the container 14. The seal 18 may connect with or adhere to the wall 15 of the container, and may interlock therewith by flowing into holes 19 in setting. If the wall 15 be of heavy, or multiply cardboard or corrugated board, a very good connection is obtained. The wall 15 may also be circumferentially re-enforced by the disc or closure 18, which aids to prevent collapse or distortion of the container. In fact, the region at the seal affords a good hand hold by resisting any inward pressure of the hand, and the seal may be of sufficient thickness, say one-fourth to one-half inch to provide ample strength. It will be understood that the humus 13 is never sufficiently solid nor packed tight enough to re-enforce the container against collapse by the hand.

In order to prevent any humus from falling out through the perforations in handling the plant package, to re-enforce the container, to afford a neat clean package, and to arrest any loss of water by evaporation from the humus, an auxiliary cover means 20 may be disposed around the container and secured thereto permanently but preferably detachably, so as to close the said perforations. This cover means may be in the nature of a box or the like, but is preferably made as a simple sleeve which may be removably slipped on and off from the container. This sleeve may be made of any suitable sheet material, such as paper.

An alternative re-enforcing construction for the container would include the provision of re-enforcing rings around the container, which rings could remain permanently in place. One simple arrangement would be to treat circular zones of the container with a material such as wax which is resistive to humus. For instance, zones as indicated between the marks denoted by 21 may be thus treated and similar coaxial zones provided at the seal and all along the container between the perforations.

In Figs. 3 and 4 is shown a modification of the invention generally similar to that previously described, except that the package may be arranged to house the stem and branches of the plant. Thus the plant 22 has its roots 23 inclosed in earth or humus 24 in a perforated paper container 25 which may be in the form of a box consisting of a plurality of detachably interengaging sections 26, 27. Thus the sections have at one end the flaps 28, 29, and at the other or top end the flaps 30, 31, which have registering slots 32 to afford a space for the passage of the plant stem. The container may also be round and have a seal 18 as above described. Enclosing the container and the branches of the plant is a box like device or sleeve 32 having closure means such as bottom and top flaps 33 to close the sleeve 32, and these flaps may be locked by fasteners or adhesive. Likewise the container may be secured to the sleeve at some points by fasteners or adhesive to assure that the device will remain in one part of the sleeve, which may be made of cardboard, or the like.

The methods of making the plant package and transplanting the same will now be briefly described. The roots of the plant are inserted into a container and humus in proper moist condition is distributed and gently packed around and between the roots, the humus being soft and easy to pack, unlike fibrous materials such as peat which require much more pressure and tend to create considerable voids. Hence the roots of the plant are not injured.

After the plant ball has been completely made up, the same is normally maintained in cold storage or otherwise at a suitably low temperature, say at 32° to 35° F., so that the bacteria and fungi in the humus are inactive and will not attack the containers. In this condition, the plant package may be handled almost indefinitely. When the plant ball is to be transplanted, the sleeve is removed, and the humus enclosed in the container inserted into the ground. This results in the creation of conditions of temperature and atmosphere within the humus, which are conducive to the activity of the fungi and bacteria which attack and rapidly destroy the container. It may be mentioned that in inserting the plant ball into the ground, the seal 18 may be removed by cracking the same or by cutting the wall of the container just below the seal.

In Fig. 5 is shown a modification of the invention showing a box or sleeve of the type disclosed in Fig. 3 as applied around the container and seal shown in Fig. 1, whereby the advantages and reenforcement of the seal is availed of for the device that protects the branches and stem of the plant.

It will be appreciated that the devices and methods herein described are capable of wide modification and are disclosed in an illustrative sense, and that the method may be practised with a substitution of different steps, and using different combinations of the steps and in various orders.

I claim:

1. A device including a plant ball, a container of pliable material for the plant ball, said container having a perforated side wall and a top opening, a removable cover for said container, said cover closing said perforations and rendering the container substantially moisture tight, and a closure for said top wall, said closure consisting of a self hardening material set about the stem of the plant and in engagement with a wall portion of the device.

2. A device including a plant ball, a container therefor having a perforated side wall, a closure extending around the stem of the plant and secured to said container for retaining the plant ball therein, and a unitary removable elongated cover sleeved around the container so as to close said perforations and extending above said container for enclosing the stem and branches of the plant.

3. A plant ball package including a mass of humus disposed about the roots of a plant, a perforated container for enclosing said mass of humus and being in contact therewith, and a removable cover disposed around the container for closing said perforations, said container and cover consisting respectively of materials rapidly disintegrable and resistive to disintegration by humus at temperatures above 50° F.

4. A device including a plant ball, a perforated container therefor having a top opening, a cover removably fitted around the container so as to close the perforations thereof, and a closure for the top opening consisting of a self hardening material set in contact with the wall of the container and in snug engagement with the stem of the plant.

5. A device including a plant ball, a perforated container therefor having a top opening through which the stem of the plant extends, a cover removably fitted around the container so as to close the perforations thereof, said cover extending above said top opening so as to enclose and protect the stem of the plant, and a closure for said top opening consisting of a seal of self hardening material engaged with the wall of said container and said stem and reenforcing the container and cover.

6. A device including a plant ball, a perforated container therefor having a top opening through which the stem of the plant extends, a cover removably fitted around the container so as to close the perforations thereof, said cover extending above said top opening so as to enclose and protect the stem of the plant, and a closure for said top opening consisting of a seal of self hardening material engaged with the stem and with said container in certain perforations thereof, and said cover retaining said material against passing out through said perforations prior to hardening.

7. A device including a plant ball, a container therefor subject to disintegration by the plant ball, said container having perforations, a cover removably fitted around the container to close said perforations, and a closure for the container consisting of a self hardening material set in contact with the stem of the plant and the container, said closure and said cover consisting of a waterproof material.

8. A device including a mass of humus disposed around the roots of the plant, means securing together the parts of the mass of humus in a compact body, said means having areas of weakness and being rapidly disintegrable at temperatures above 50° C., and a moisture proof cover removably sleeved on the container.

9. A device including a plant ball, a porous disintegrable container therefor having an opening for the stem of the plant, a seal of self hardening material set in said opening and in engagement with the plant stem, and a moisture proof cover enclosing said container.

10. A device including a plant ball, a pliable container therefor having a side wall and a top opening so that the stem of the plant can project out of said opening, said side wall having a lateral opening extending therethrough, and a seal of self hardening material set in said top opening in contact with the plant stem and said wall and forming projections extending into said lateral openings.

11. The method of transplanting plant balls including packing humus around the roots of a plant and causing the humus and roots to be encased in a container rapidly disintegrable by the humus at temperatures above 50° F., enclosing said container in a moisture proof carton to retain the moisture of the humus while the plant ball is handled, maintaining the plant ball at a relatively low temperature, and finally removing said carton, transplanting the plant ball with the container, and maintaining a temperature above 50° F.

JOHN THOMPSON LOVETT, Jr.